(12) United States Patent
May

(10) Patent No.: US 6,357,657 B1
(45) Date of Patent: Mar. 19, 2002

(54) ANTI-FRAUD DEVICE

(75) Inventor: David C. C. May, Darsie (GB)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/589,693

(22) Filed: Jun. 8, 2000

(30) Foreign Application Priority Data

Jun. 29, 1999 (GB) .............................................. 9915195

(51) Int. Cl.7 .................................................. G06K 7/06
(52) U.S. Cl. ..................................... 235/441; 235/379
(58) Field of Search ................................ 235/441, 379

(56) References Cited

U.S. PATENT DOCUMENTS 4,434,359 A * 2/1984 Watanabe ................... 235/379

FOREIGN PATENT DOCUMENTS

| EP | 0226309 | 6/1987 |
|---|---|---|
| EP | 0274302 | 7/1988 |
| EP | 0780814 | 6/1997 |
| GB | 2137393 | 10/1984 |

* cited by examiner

*Primary Examiner*—Harold I. Pitts
(74) *Attorney, Agent, or Firm*—Francis L. Conte

(57) ABSTRACT

An anti-fraud device (100) for use with a self-service terminal (12), such as an ATM, is described. The device (100) has a housing (130) that is adapted for covering an entry slot (26) for a motorized card reader module so that only part of the width of a card (28) is accessible by a user when presented to the user by the motorized card reader module. The housing (130) has a profiled edge (132) for simultaneously exposing part of the width of a card and covering part of the width of a card. The housing (130) may be mounted on a plate (140) for coupling to an ATM. A fraud prevention system; a method of preventing fraud at an SST; and an SST incorporating an anti-fraud device are also described.

18 Claims, 2 Drawing Sheets

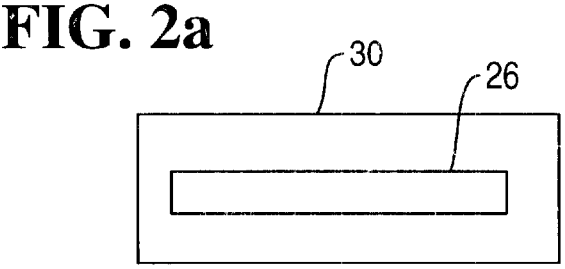
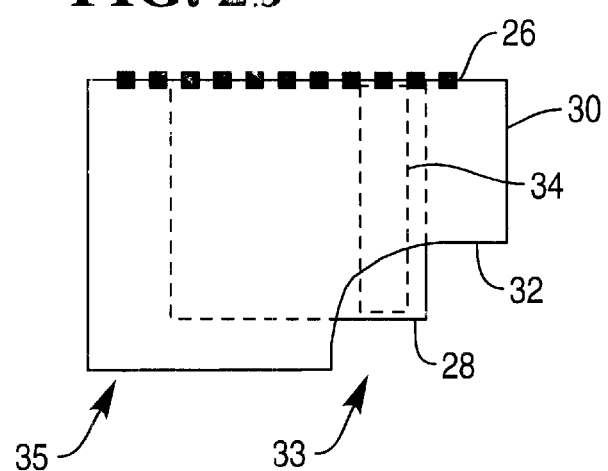
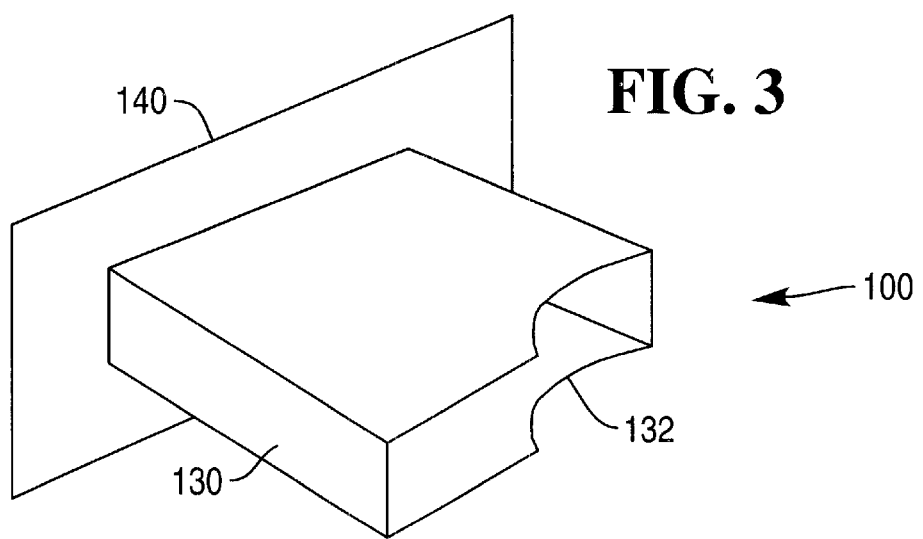

ANTI-FRAUD DEVICE

BACKGROUND OF THE INVENTION

The present invention relates to an anti-fraud device for use with a self-service terminal (SST), such as an automated teller machine (ATM). The invention also relates to an SST incorporating an anti-fraud device, to a fraud prevention system, and to a method of preventing fraud at an SST.

One type of fraud that occurs at an ATM is for a third party to place a small module in front of the ATM's motorized card reader. The module is professionally designed so that it conforms to the appearance of the ATM and is not obvious to a user. The module generally has a magnetic head for reading the magnetic stripe commonly used on banking cards. The module also has electronics associated with the magnetic head for reading the data stored on the magnetic stripe, and has either a memory for storing the read data or transmission apparatus for transmitting the read data to the third party.

As the module is small, it does not impede insertion or removal of the user's card. When the user enters his card, the motorized card reader pulls the card in smoothly so that the (genuine) magnetic card reader can read the card. However, as the card is pulled through the small module by the motorized card reader, the card reader in the (fraudulent) module reads the data on the magnetic stripe.

The user is unaware that his card has been read by the fraudulent module because the module is small and unobtrusive and because the module does not impede insertion or removal of the card. Once the card data is known, the third party can re-construct the user's card. A variety of techniques may be used to obtain a user's PIN. For example, a false keypad overlay may be located above the actual keypad, such that when a user enters their PIN, the sequence of digits is recorded by the false keypad. Alternatively, a user may simply be observed while using the ATM and their PIN noted. If the third party can obtain the user's PIN, then the third party has both the card details and the PIN, thereby enabling the third party to generate a counterfeit card and to make withdrawals from the user's bank account without the user's knowledge.

SUMMARY OF THE INVENTION

According to a first aspect of the invention there is provided an anti-fraud device for use with a self-service terminal characterized in that the device has a housing that is adapted for covering an entry slot for a motorized card reader module so that only part of the width of a card is accessible by a user when presented to the user by the motorized card reader module.

Preferably, the part of the width of the card that is accessible by a user has a magnetic stripe; that is, the magnetic stripe is not covered by the housing. The advantage of this is that a user will grasp the magnetic stripe to remove the card, thereby blocking the magnetic stripe from any fraudulent card reader module.

Preferably, the housing has a profiled edge for exposing part of the width of a card and covering part of the width of a card.

Preferably, the housing is mounted on a plate for coupling the device to an SST.

By virtue of this aspect of the invention, any third party module located in front of the housing to read the magnetic stripe would cause the card to be either completely covered, or covered to such an extent that the card is not accessible to the user, thereby ensuring that the customer cannot retrieve his card. This would alert the user to the fact that there is a problem.

According to a second aspect of the invention there is provided a method of preventing fraud at an SST, characterized by the step of: providing a housing for covering an entry slot for a motorized card reader module, where the housing is adapted so that only part of the width of a card is accessible by a user.

Preferably, the method comprises the further step of alerting the owner of the SST to the possibility of fraud when a card cannot be removed by the cardholder. This has the advantage that if a third party module is placed over the housing then the SST will alert the owner because the cardholder will not be able to remove his card. This limits possible fraud to one card and provides immediate notification to the possibility of fraud occurring.

According to a third aspect of the invention there is provided a self-service terminal, characterized in that the terminal has a fascia incorporating a housing, where the housing is aligned with an entry/exit slot for a motorized card reader module, and the housing is adapted to ensure that only part of the width of a card is accessible by a user when presented by the motorized card reader module.

According to a fourth aspect of the invention there is provided a fraud prevention system comprising a self-service terminal and characterized in that the system includes a housing for shielding at least part of the width of a card, so that, in use, the system presents a card to a user in such a way as to shield at least part of the card.

Preferably, the housing is configured to ensure that at least part of the width of the card does not protrude through the housing.

BRIEF DESCRIPTION OF THE DRAWINGS

These and other aspects of the invention will now be described, by way of example, with reference to the accompanying drawings, in which:

FIGS. 2a and 2b are block diagrams of part of the system of FIG. 1; and

FIG. 3 shows a perspective view of an anti-fraud device in accordance with another embodiment of the invention.

DETAILED DESCRIPTION

Figure 1:
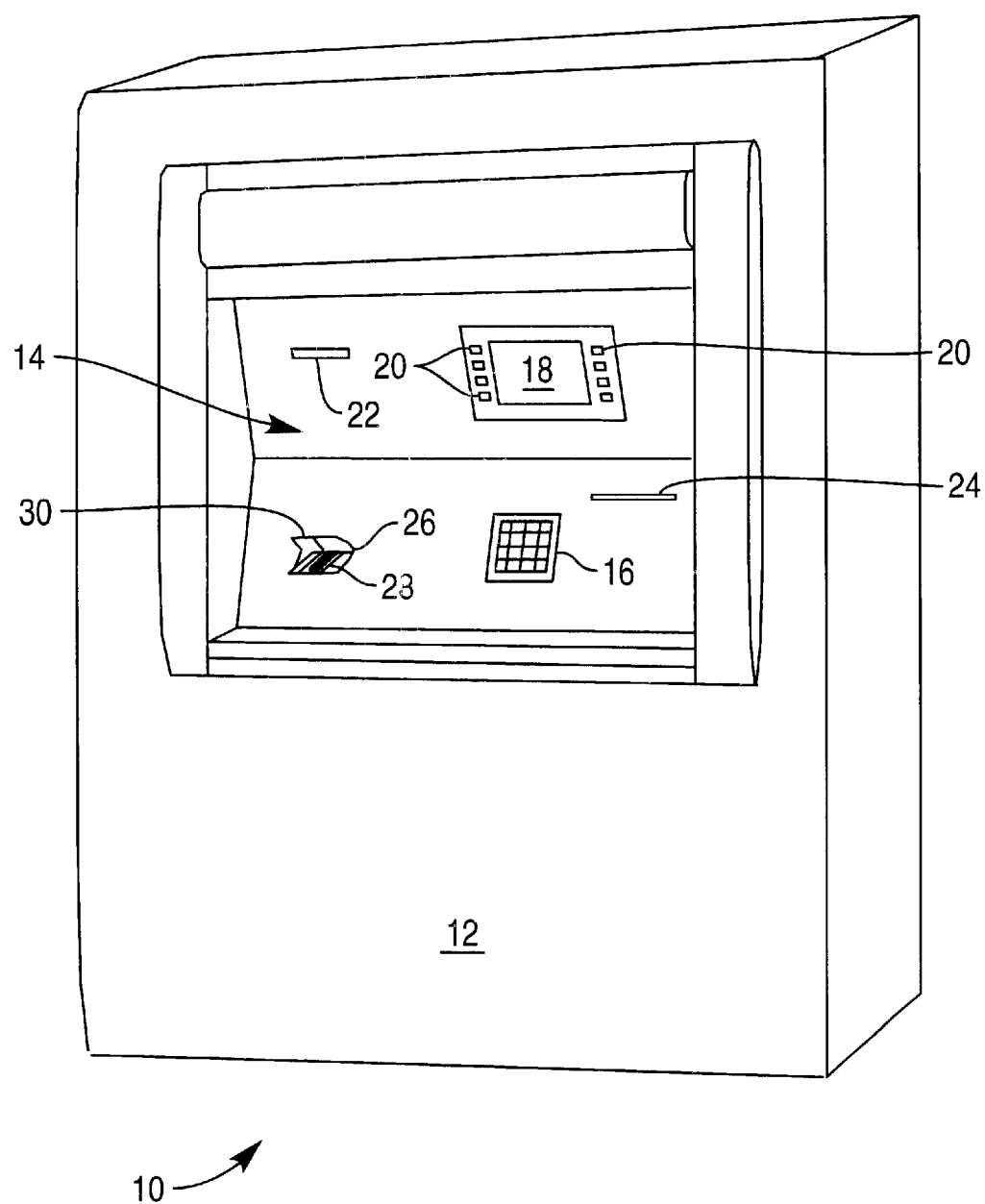
FIG. 1 is a block diagram of a fraud prevention system in accordance with one embodiment of the invention.

Referring to FIG. 1, there is shown a fraud prevention system 10 incorporating a self-service terminal 12 in the form of an ATM. The ATM 12 has a user interface fascia 14 including an encrypting keypad 16, a display 18 having keys 20 aligned therewith, a receipt slot 22 through which printed receipts are dispensed, a cash dispense slot 24, and a card entry/exit slot 26 for receiving and delivering a banking card 28. The card entry/exit slot 26 is located in a recess in the fascia 14, and the slot 26 is aligned with a motorized card reader module (not shown) located behind the fascia 14. The fascia 14 also incorporates an integral housing 30 for covering part of the width of the banking card 28. The housing 30 is also located in the recess.

FIGS. 2a and 2b show front and plan views respectively of the housing 30. Housing 30 completely surrounds the entry/exit slot 26, and has a profiled leading edge 32 (best shown by FIG. 2b).

Edge 32 is shaped to define an access area 33 and a covered area 35. The access area 33 provides access to part of the width of the card 28, so that the only part of the width of the card 28 that is accessible to a user is in the region defined by the access area 33. In this embodiment a corner of the card 28 is accessible to a user; in particular, the portion of the card 28 having the magnetic stripe 34 (shown in dotted line) is not covered. This ensures that any third party module placed in front of the access area 33 will ensure that the user cannot remove his card because he will not be able to get sufficient grip to hold the card 28. Any module placed in front of the covered area 35 will not come into close proximity to the magnetic stripe 34, so the third party module will not be able to read the information contained in the magnetic stripe 34.

The profiled edge 32 simultaneously exposes part of the width of the card 28 and covers part of the width of the card 28.

In the event of the ATM 12 detecting that a card 28 has not been removed by a user, the ATM 12 alerts the owner of the ATM by sending a signal to a remote host (not shown). The signal may be dedicated for indicating fraud, or it may be a signal indicating a critical failure. The alert signal may be generated by a software module that is used to operate the ATM 12. The ATM 12 may also advise the cardholder to contact his bank branch immediately so that the card can be de-activated before a third party has time to generate a counterfeit card.

For ATMs that are currently in use, an anti-fraud device 100 as shown in FIG. 3 may be used. Device 100 has a housing 130 that is very similar to housing 30 of FIGS. 1 and 2. However, housing 130 is coupled to a fixing plate 140. The plate 140 may be fixed to an ATM using any convenient method. Device 100 is aligned with an entry/exit slot of a card reader module. Housing 130 has a profiled leading edge 132 for exposing only part of the width of a card. One advantage of device 100 is that it can be retrofitted to an ATM without requiring major modifications to the fascia of the ATM.

Various modifications may be made to the above described embodiments within the scope of the present invention. For example, the profiled edge may be configured to conform to the appearance and/or shape of the ATM fascia. The SST may be a non-cash terminal.

What is claimed is:

1. An anti-fraud device for use with a self-service terminal, the device comprising:
   a housing for covering a fascia entry slot for a motorized card reader module such that only a part of the width of a card is accessible by a user when the motorized card reader module presents the card to the user.

2. A anti-fraud device according to claim 1, wherein the part of the width of the card that is accessible by a user has a magnetic stripe.

3. A anti-fraud device according to claim 1, wherein the housing includes a profiled edge for exposing part of the width of a card and covering part of the width of the card.

4. An anti-fraud device according to claim 1, wherein the housing includes a plate for coupling the device to a self-service terminal.

5. A method of preventing fraud at a self-service terminal, the method comprising:
   covering a fascia entry slot for a motorized card reader module such that only part of the width of a card is accessible by a user when the motorized card reader module presents the card to the user.

6. A method according to claim 5, further comprising:
   alerting an owner of the self-service terminal to the possibility of fraud when a card is not removed by a user.

7. A self-service terminal comprising:
   a fascia incorporating a housing which is aligned with an entry/exit slot for a motorized card reader module, the housing including means for ensuring that only part of the width of a card is accessible by a user when the motorized card reader module presents the card to the user.

8. A self-service terminal according to claim 7, wherein the means includes a profiled edge for simultaneously exposing part of the width of a card and covering part of the width of the card.

9. A fraud prevention system comprising:
   a self-service terminal including a fascia entry slot for receiving a card from a user; and
   a housing covering said entry slot for shielding at least part of the width of a card when the card is presented to the user.

10. A fraud prevention system according to claim 9, wherein the housing includes means for ensuring that at least part of the width of a card is unable to protrude through the housing.

11. A fraud prevention system according to claim 9, wherein the housing includes a profiled edge for exposing part of the width of a card and covering part of the width of the card.

12. A fraud prevention system according to claim 9, wherein the housing includes a plate for coupling to the self-service terminal.

13. An automated teller machine comprising:
   a user interface fascia including a keypad, display, receipt slot, cash dispense slot, and a card slot for receiving a banking card by a motorized card reader located behind said fascia;
   a housing externally surrounding said card slot, and including an opening defined by a leading edge through which said card may be inserted into said card slot;
   said card having a magnetic stripe extending along one side thereof perpendicular to the width of said card, and said card slot and housing being sized in width for receiving said card in width dimension, with said stripe being disposed perpendicular to said fascia; and
   said housing protrudes externally from said card slot to cover in most part said card when said card is returned to a user by the card reader while exposing only a part of said card width.

14. A machine according to claim 13 wherein said housing leading edge has a corner profile correspondingly exposing only a corner of said card upon said card return.

15. A machine according to claim 14 wherein said housing is affixed to said fascia for aligning said corner profile with said magnetic stripe upon said card return.

16. A machine according to claim 15 wherein said housing is integral with said fascia, with a proximal end surrounding said card slot.

17. A machine according to claim 15 wherein said housing further includes a fixing plate integrally joined to a proximal end thereof, and said fixing plate is configured for attachment to said fascia around said card slot.

18. A machine according to claim 15 wherein said housing further comprises a hollow rectangular box having a proximal end surrounding said card slot, and said leading. edge is disposed at an opposite distal end thereof.

* * * * *

UNITED STATES PATENT AND TRADEMARK OFFICE
CERTIFICATE OF CORRECTION

PATENT NO. : 6,357,657 B1
DATED : March 19, 2002
INVENTOR(S) : May, D. C. C.

It is certified that error appears in the above-identified patent and that said Letters Patent is hereby corrected as shown below:

Column 4,
Line 61, after "leading" delete ".".

Signed and Sealed this

Eleventh Day of June, 2002

Attest:

JAMES E. ROGAN
Attesting Officer  Director of the United States Patent and Trademark Office